US011035927B2

(12) United States Patent
Stählin

(10) Patent No.: US 11,035,927 B2
(45) Date of Patent: Jun. 15, 2021

(54) APPARATUS AND METHOD FOR DETERMINING A GEOGRAPHICAL POSITION OF A VEHICLE

(71) Applicant: Continental Teves AG & Co. oHG, Frankfurt am Main (DE)

(72) Inventor: Ulrich Stählin, Rochester, MI (US)

(73) Assignee: Continental Teves AG & Co. oHG

( * ) Notice: Subject to any disclaimer, the term of this patent is extended or adjusted under 35 U.S.C. 154(b) by 217 days.

(21) Appl. No.: 16/337,958

(22) PCT Filed: Oct. 26, 2017

(86) PCT No.: PCT/DE2017/200114
§ 371 (c)(1),
(2) Date: Mar. 29, 2019

(87) PCT Pub. No.: WO2018/077358
PCT Pub. Date: May 3, 2018

(65) Prior Publication Data
US 2020/0025858 A1    Jan. 23, 2020

(30) Foreign Application Priority Data

Oct. 26, 2016    (DE) ............... 10 2016 221 027.0

(51) Int. Cl.
*G01S 5/00*    (2006.01)
*H04W 4/40*    (2018.01)
(Continued)

(52) U.S. Cl.
CPC ............ *G01S 5/0072* (2013.01); *G01S 19/48* (2013.01); *G08G 1/052* (2013.01); *H04W 4/40* (2018.02); *G01S 19/33* (2013.01)

(58) Field of Classification Search
CPC ........ G01S 5/0072; G01S 19/48; G01S 19/33; G01S 19/42; H04W 4/40; H04W 4/44; H04W 4/46; G08G 1/052
See application file for complete search history.

(56) References Cited

U.S. PATENT DOCUMENTS 8,930,041 B1 *   1/2015   Grimm ................ G07C 5/008
                                                            701/1
10,515,543 B2 *  12/2019  Madigan ............. G08G 1/0116
(Continued)

FOREIGN PATENT DOCUMENTS

JP          10-6928      *   1/1998
WO          0163316 A1       8/2001
WO          2015189133 A1    12/2015

OTHER PUBLICATIONS

International Search Report and Written Opinion for International Application No. PCT/DE2017/200114, dated Feb. 19, 2018—7 pages.

*Primary Examiner* — Michael J Zanelli
(74) *Attorney, Agent, or Firm* — RatnerPrestia

(57) ABSTRACT

An apparatus and a method for determining a geographical position of a vehicle. The apparatus includes a satellite navigation receiver designed to receive satellite signals, a sensor designed to capture a motion parameter of the vehicle, and a processor designed to generate a V2X communication message, wherein the V2X communication message indicates the motion parameter of the vehicle, and to determine the geographical position of the vehicle by the satellite signals in response to an initiating of the generation of the V2X communication message.

15 Claims, 3 Drawing Sheets

(51) Int. Cl.
  *G01S 19/48*   (2010.01)
  *G08G 1/052*   (2006.01)
  *G01S 19/33*   (2010.01)

(56) References Cited

U.S. PATENT DOCUMENTS

| | | | |
|---|---|---|---|
| 10,755,491 B2 * | 8/2020 | Lee | H04W 4/12 |
| 2020/0084738 A1 * | 3/2020 | Nguyen | H04W 64/003 |

* cited by examiner

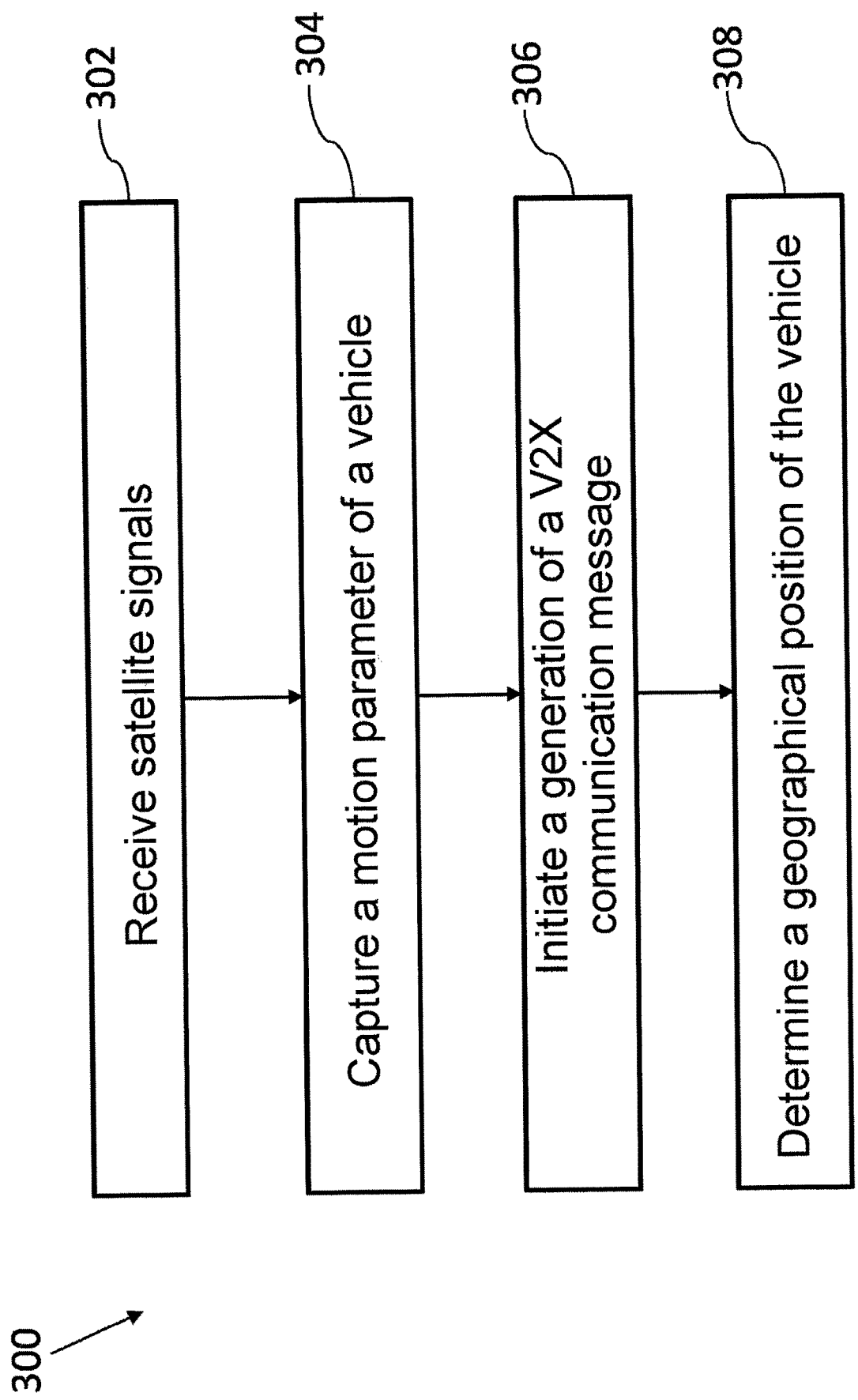

APPARATUS AND METHOD FOR DETERMINING A GEOGRAPHICAL POSITION OF A VEHICLE

CROSS REFERENCE TO RELATED APPLICATIONS

This application is the U.S. National Phase Application of PCT International Application No. PCT/DE2017/200114, filed Oct. 26, 2017, which claims priority to German Patent Application No. 10 2016 221 027.0, filed Oct. 26, 2016, the contents of such applications being incorporated by reference herein.

FIELD OF THE INVENTION

The present invention relates to an apparatus and a method for determining a geographical position of a vehicle, in particular for determining the geographical position of the vehicle on the basis of satellite signals.

BACKGROUND OF THE INVENTION

To increase safety in road traffic, modern vehicles use V2X (vehicle-to-X) systems such as, for example, Car2X systems that allow communication messages to be wirelessly transmitted between different road users. Some of these communication messages (e.g. the cooperative awareness message, CAM) can comprise information about the present geographical position, the direction of travel, the speed and the dimensions of the sending vehicle. On the basis of this information, applications are possible that can be used to optimise the flow of traffic and/or to provide drivers with information and if need be to make them aware of dangerous situations. In particular, a suitable receiver allows a global satellite navigation system (GNSS) to be used to determine the present geographical position of the vehicle.

So that a satellite navigation receiver can determine a geographical position of a vehicle, it needs to receive signals from at least four satellites. The signal of a satellite contains, among other things, information about its position and its local time. From the difference between the satellite time and the time at which the signal was received, the satellite navigation receiver calculates its distance from the satellite and, on the basis of that, the geographical position of the vehicle.

Furthermore, it is known practice, when locating a vehicle in absolute coordinate systems, to fuse GNSS information with driving dynamics data. There are different approaches for this, such as, for example, what is known as the loose coupling approach, which involves a position (for example what is known as the single point position, SPP) being calculated from the GNSS data, said position then being fused with driving dynamics data.

This method allows the individual calculation steps to be separated, and hence simple modularisation; the calculation of the SPP is typically very time-consuming in terms of computing, however.

SUMMARY OF THE INVENTION

An aspect of the present invention aims to provide an efficient apparatus and an efficient method for determining a geographical position of a vehicle.

According to a first aspect, the object is achieved by an apparatus for determining a geographical position of a vehicle. The apparatus comprises a satellite navigation receiver designed to receive satellite signals, a sensor designed to capture a motion parameter of the vehicle, and a processor designed to generate a V2X communication message, wherein the V2X communication message indicates the motion parameter of the vehicle, and to determine the geographical position of the vehicle by means of the satellite signals in response to an initiating of the generation of the V2X communication message. Initiating the V2X communication message is understood in this context to mean that the necessary information for the generation of the V2X communication message starts to be ascertained. The ascertained information and the geographical position can be taken as a basis for generating the V2X communication message.

The processor can be integrated in a control unit (electronic control unit, ECU) of the vehicle, or can be implemented as a control unit of the vehicle. The processor can further comprise a microprocessor or an integrated circuit, or can be implemented as a microprocessor or integrated circuit.

According to one embodiment of the apparatus, the apparatus further comprises a communication interface for transmitting the V2X communication message.

The communication interface can be a wireless V2X communication interface. The communication interface can be connected to at least one vehicle antenna, and can furthermore be designed for receiving V2X communication messages from other vehicles. The communication interface can be connected to a V2X communication chip of the vehicle, or can be integrated in a V2X communication chip of the vehicle.

The processor can be connected to the communication interface for communication purposes in order to receive the V2X communication messages, which can define a travel situation of a further vehicle. The processor can be designed to evaluate the V2X communication messages in order to detect the travel situation of the further vehicle. The processor and the communication interface can each be connected to a communication network of the vehicle, in particular to a vehicle bus.

According to one embodiment of the apparatus, the V2X communication message comprises a CAM communication message and/or a DENM communication message and/or a BSM communication message and/or further standardised V2X communication messages. According to one embodiment of the apparatus, the satellite navigation receiver is a NAVSTAR GPS, a GLONASS, a GALILEO or a BEIDOU satellite navigation receiver.

According to one embodiment of the apparatus, the V2X communication message further indicates the geographical position of the vehicle.

According to one embodiment of the apparatus, the processor is further designed to provide the V2X communication message at a first time, and to determine the geographical position of the vehicle at a second time, wherein a difference between the first time and the second time is smaller than a predetermined value.

This achieves the advantage that an error in the determined geographical position of the vehicle that is indicated in the V2X messages can be very small without needing additional computing power.

Furthermore, it achieves the advantage that the generation of the V2X communication message and the determining of the geographical position of the vehicle can be synchronised. This has the advantage that the determining of the geographical position (e.g. by means of the calculation of an SPP) of the vehicle can be completed precisely when a V2X communication message is also supposed to be sent. If the difference between the first time and the second time is not smaller than a predetermined value, this can lead to the SPP having been calculated some time before the sending of a V2X communication message and hence possibly being unnecessarily old. By way of example, a calculation of the SPP in increments at 10 Hz and with a time error of no more than 100 ms when the vehicle is at a speed of 130 km/h (36 m/s) involves an error of 3.6 m in the determined geographical position. Even if the position of the vehicle can be calculated more frequently than at 10 Hz by driving dynamics data, the calculation of the absolute geographical position of the vehicle should be effected on the basis of satellite signals.

According to one embodiment, the synchronisation described above involves starting directly at the satellite navigation receiver. The latter typically takes the satellite signals as a basis for periodically ascertaining satellite raw data (e.g. pseudo-range measurements or carrier phase measurements). These satellite raw data .can then be synchronised with the transmit times of the V2X communication messages.

According to one embodiment of the apparatus, the satellite navigation receiver is designed to preprocess the satellite signals at a first frequency, wherein the first frequency is higher than a second frequency of the generation of the V2X communication message.

This has the advantage that the computation load for the preprocessing of the satellite signals can be reduced in comparison with the calculation of the SPP. Furthermore, it has the advantage that preferably new preprocessed satellite raw data are available to the processor at a time of the determination of the SPP.

According to one embodiment of the apparatus, the first frequency is 100 Hz or 1 kHz.

According to one embodiment of the apparatus, the processor is further designed to determine the geographical position of the vehicle on the basis of pseudo-range measurements or carrier phase measurements or a combination of these.

According to one embodiment of the apparatus, the processor is further designed to determine a speed of the vehicle on the basis of the satellite signals.

According to one embodiment of the apparatus, the satellite navigation receiver is implemented by means of a software defined radio (SDR) receiver.

This achieves the advantage that the satellite navigation receiver can be adjusted efficiently by using a piece of software.

A second aspect of the invention is a method for determining a geographical position of a vehicle. The method comprises the following steps: receiving satellite signals, capturing a motion parameter of the vehicle, generating a V2X communication message, wherein the V2X communication message indicates the motion parameter of the vehicle, and determining the geographical position of the vehicle by means of the satellite signals in response to an initiating of the generation of the V2X communication message.

According to one embodiment of the method, the V2X communication message indicates the determined geographical position of the vehicle.

The method can be carried out by the apparatus. Further features of the method result directly from the functionality and/or the features of the apparatus.

A third aspect of the invention is a computer program having a program code for performing the method according to the second aspect when the program code is executed on a computer.

The apparatus can be installed in automobiles, in aircraft or in ships.

BRIEF DESCRIPTION OF THE DRAWINGS

Further exemplary embodiments are explained in more detail with reference to the appended figures:

FIG. 3 shows a schematic depiction of a method for determining a geographical position of a vehicle according to one embodiment.

DETAILED DESCRIPTION OF THE PREFERRED EMBODIMENTS

In the detailed description that follows, reference is made to the accompanying drawings, which form a part thereof and which show, as an illustration, specific embodiments in which aspects of the invention are able to be implemented. It goes without saying that other embodiments can also be used and structural or logical changes can be made without departing from the concept of aspects of the present invention. The detailed description that follows should therefore not be understood in a restrictive sense. It also goes without saying that the features of the various exemplary embodiments described herein can be combined with one another unless specifically stated otherwise.

The aspects and embodiments are described with reference to the drawings, wherein identical reference signs generally relate to identical elements. Numerous specific details are set out for the purposes of explanation in the description that follows in order to provide an in-depth understanding of one or more aspects of the invention. However, it may be obvious to a person skilled in the art that one or more aspects or embodiments can be implemented with a lower level of the specific details. In other cases, known structures and elements are illustrated in a schematic form in order to facilitate the description of one or more aspects or embodiments. It goes without saying that other embodiments can be used and structural or logical changes can be made without departing from the concept of aspects of the present invention.

Even though a particular feature or a particular aspect of an embodiment may have been disclosed with respect to only one of multiple implementations, such a feature or such an aspect can also be combined with one or more other features or aspects of the other implementations, as may be desired and advantageous for a given or particular application. Furthermore, to the extent to which the expressions "contain", "have", "having" or other variants thereof are used either in the detailed description or in the claims, such expressions are intended to be inclusive in a manner similar to the expression "comprise". The expressions "coupled" and "connected" may have been used together with derivatives thereof. It goes without saying that such expressions are used to state that two elements cooperate or interact with one another irrespective of whether they are in direct physical or electrical contact or are not in direct contact with one another. In addition, the expression "exemplary" should be interpreted only as an example instead of denoting the best or optimum case. The following description should therefore not be understood in a restrictive sense.

Figure 1:
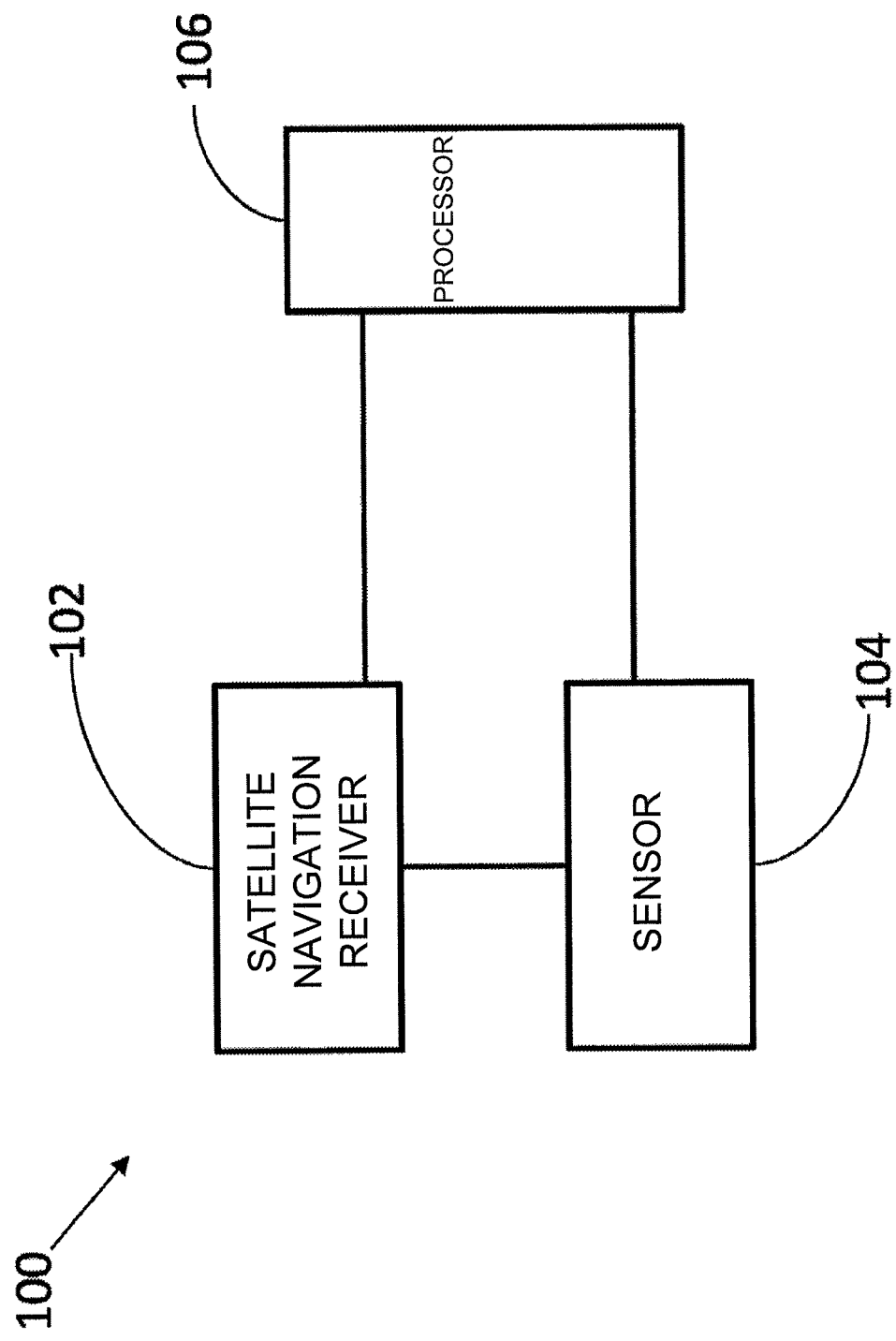
FIG. 1 shows a schematic depiction of an apparatus for determining a geographical position of a vehicle according to one embodiment.

FIG. 1 shows a schematic depiction of an apparatus 100 for determining a geographical position of a vehicle 208 according to one embodiment. The apparatus 100 comprises a satellite navigation receiver 102 designed to receive satellite signals, a sensor 104 designed to capture a motion parameter of the vehicle 208, and a processor 106 designed to generate a V2X communication message, wherein the V2X communication message indicates the motion parameter of the vehicle 208, and to determine the geographical position of the vehicle 208 by means of the satellite signals in response to an initiating of the generation of the V2X communication message.

Instead of determining the geographical position of the vehicle in fixed increments (for example at 10 Hz), it can advantageously be determined when a V2X communication message is supposed to be sent, the determining of the geographical position of the vehicle being very important for the communication messages CAM (Cooperative Awareness Message) and DENM (Decentralized Environmental Notification Message) and BSM (Basic Safety Message), in particular. This is furthermore advantageous if for example a congestion controller reduces the frequency at which V2X communication messages are sent. A higher density of V2X communication messages also means more effort for the applications (or apps) based thereon. It is thus advantageous if there is more computing time available for the apps at these times and less computing time is used for the calculation or determination of the geographical position of the vehicle.

This furthermore achieves the technical advantage that the described apparatus can couple the determining of the geographical position of the vehicle (for example by means of a single point position (SPP) calculation and, if need be, a loosely coupled fusion approach based thereon) and the generation of the V2X communication message. This has the advantage that simple load distribution can be achieved, since both computing operations (determining the SPP and generation of the V2X communication message) can take place on a processor or microcontroller.

Figure 2:
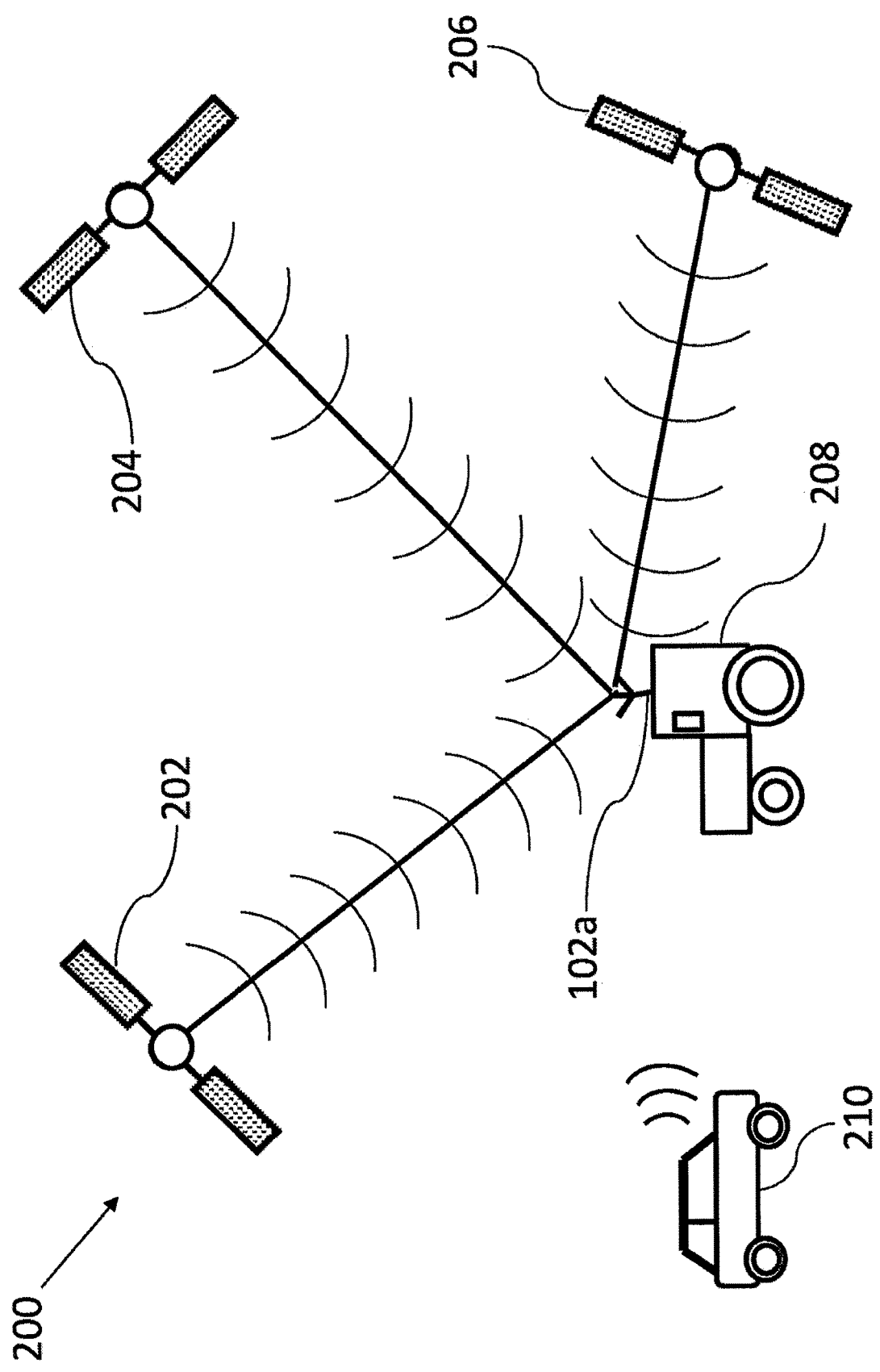
FIG. 2 shows a schematic depiction of an arrangement having an apparatus for determining a geographical position of a vehicle according to one embodiment.

FIG. 2 shows a schematic depiction of an arrangement 200 having an apparatus 100 for determining a geographical position of a vehicle 208 according to one embodiment. According to one embodiment, the apparatus 100 comprises a satellite navigation receiver 102 designed to receive satellite signals from the satellites 202, 204 and 206 by means of an antenna 102a.

According to one embodiment, the apparatus 100 comprises a sensor 104 designed to capture a motion parameter of the vehicle 208, and a processor 106 designed to generate a V2X communication message of the vehicle 208, and to determine the geographical position of the vehicle 208 by means of the satellite signals in response to an initiating of the generation of the V2X communication message. Furthermore, the apparatus 100 can comprise a V2X communication interface for transmitting and/or receiving V2X communication messages. The V2X communication interface can be designed to receive V2X communication messages from a further vehicle 210. In response to the reception of the V2X communication messages from the further vehicle 210 and/or to specific motion parameters of the vehicle 208 and/or to cyclic trigger times, the processor can generate V2X communication messages of the vehicle 208. Further, the V2X communication messages of the vehicle 208 and the geographical position of the vehicle 208 can be transmitted by the V2X communication interface of the vehicle 208.

FIG. 3 shows a schematic depiction of a method 300 for determining a geographical position of a vehicle 208 according to one embodiment. The method 300 comprises the following steps: receiving 302 satellite signals, capturing 304 a motion parameter of the vehicle 208, generating a V2X communication message, in particular initiating 306 the generation of a V2X communication message, wherein the V2X communication message indicates the motion parameter of the vehicle 208, and determining 308 the geographical position of the vehicle 208 by means of the satellite signals in response to the initiating 306 of the generation of the V2X communication message.

According to one embodiment of the method, the V2X communication message indicates the determined geographical position of the vehicle.

LIST OF REFERENCE SIGNS

100 Apparatus
102 Satellite navigation receiver
102a Antenna
104 Sensor
106 Processor
200 Arrangement
202 Satellite
204 Satellite
206 Satellite
208 Vehicle
210 Vehicle
300 Method
302 Receive
304 Capture
306 Initiate
308 Determine

The invention claimed is:

1. An apparatus for determining a geographical position of a vehicle, comprising:
   a satellite navigation receiver designed to receive satellite signals;
   a sensor designed to capture a motion parameter of the vehicle; and
   a processor designed to:
      generate a V2X communication message, wherein the V2X communication message indicates the motion parameter of the vehicle, and
      in response to an initiating of the generation of the V2X communication message, calculate the geographical position of the vehicle by calculating a position from the satellite signals.

2. The apparatus as claimed in claim 1, wherein the apparatus further comprises a communication interface for transmitting the V2X communication message.

3. The apparatus as claimed in claim 2, wherein the V2X communication message comprises at least one of a CAM communication message, a DENM communication message, or a BSM communication message.

4. The apparatus as claimed in claim 1, wherein the V2X communication message comprises at least one of a CAM communication message, a DENM communication message, or a BSM communication message.

5. The apparatus as claimed in claim 1, wherein the satellite navigation receiver is a NAVSTAR GPS, a GLONASS, a GALILEO or a BEIDOU satellite navigation receiver.

6. The apparatus as claimed in claim 1, wherein the processor is further designed to provide the V2X communication message at a first time, and to determine the geographical position of the vehicle at a second time, wherein a difference between the first time and the second time is smaller than a predetermined value.

7. The apparatus as claimed in claim 1, wherein the V2X communication message further indicates the geographical position of the vehicle.

8. An apparatus for determining a geographical position of a vehicle, comprising:
   a satellite navigation receiver designed to receive satellite signals;
   a sensor designed to capture a motion parameter of the vehicle; and
   a processor designed to:
      generate a V2X communication message, wherein the V2X communication message indicates the motion parameter of the vehicle, and
      determine the geographical position of the vehicle by the satellite signals in response to an initiating of the generation of the V2X communication message,
      wherein the satellite navigation receiver is designed to preprocess the satellite signals at a first frequency, and wherein the first frequency is higher than a second frequency of the generation of the V2X communication message.

9. The apparatus as claimed in claim 8, wherein the first frequency is 100 Hz or 1 kHz.

10. The apparatus as claimed in claim 1, wherein the processor is further designed to determine the geographical position of the vehicle on the basis of pseudo-range measurements or carrier phase measurements or a combination of these.

11. The apparatus as claimed in claim 1, wherein the processor is further designed to determine a speed of the vehicle on the basis of the satellite signals.

12. The apparatus as claimed in claim 1, wherein the satellite navigation receiver and the processor are implemented by an SDR receiver.

13. A method for determining a geographical position of a vehicle, comprising:
   receiving satellite signals;
   capturing a motion parameter of the vehicle;
   generating a V2X communication message, wherein the V2X communication message indicates the motion parameter of the vehicle; and
   in response to an initiating of the generation of the V2X communication message, calculating the geographical position of the vehicle by calculating a position from the satellite signals.

14. The method as claimed in claim 13, wherein the V2X communication message indicates the determined geographical position of the vehicle.

15. A non-transitory computer readable medium having computer program code stored thereon for performing the method as claimed in claim 14 when the program code is executed on a computer.

* * * * *